United States Patent [19]

Kobashi

[11] Patent Number: 5,776,323
[45] Date of Patent: Jul. 7, 1998

[54] DIAMOND ELECTRODE

[75] Inventor: Koji Kobashi, Kobe, Japan

[73] Assignee: Kabushiki Kaisha Kobe Seiko Sho, Kobe, Japan

[21] Appl. No.: 668,358

[22] Filed: Jun. 26, 1996

[30] Foreign Application Priority Data

Jun. 29, 1995 [JP] Japan .................... 7-163561

[51] Int. Cl.$^6$ .................... C25B 11/12
[52] U.S. Cl. .................... 204/294; 257/57; 257/76; 257/77; 257/249; 257/253; 257/288; 257/289; 257/364; 438/105
[58] Field of Search .................... 204/294; 257/57, 257/76, 77, 253, 249, 288, 289, 364; 438/105

[56] References Cited

U.S. PATENT DOCUMENTS

| | | | |
|---|---|---|---|
| 5,051,785 | 9/1991 | Beetz, Jr. et al. | 438/105 |
| 5,099,296 | 3/1992 | Mort et al. | 357/22 |
| 5,298,106 | 3/1994 | Kobacoff et al. | 438/105 |
| 5,309,000 | 5/1994 | Saito et al. | 438/105 |
| 5,512,873 | 4/1996 | Saito et al. | 338/22 |
| 5,593,783 | 1/1997 | Miller et al. | 428/408 |

*Primary Examiner*—Bruce F. Bell
*Attorney, Agent, or Firm*—Oblon, Spivak, McClelland, Maier & Neustadt, P.C.

[57] ABSTRACT

The present invention is a diamond electrode with high efficiency, a small overvoltage, and a long lifetime, which is reusable, and which can measure the temperature of the electrode. The diamond electrode is at least partially composed of a semiconducting diamond film, whose surface is chemically modified. Another embodiment of the present invention carbon is used as a bare electrode material, diamond crystals are fixed to the bare electrode material, the surface of the undoped diamond crystals are covered with semiconducting diamond film, or semiconducting diamond crystals are fixed to said bare electrode material, and the surfaces of diamond films or crystals are chemically modified. Furthermore, wires may be connected to the diamond electrode to measure the electrical resistance, and hence the temperature.

20 Claims, 4 Drawing Sheets

DIAMOND ELECTRODE

BACKGROUND OF THE INVENTION

1. Field of the Invention

The present invention relates to a diamond electrode having high efficiency, a small overvoltage and a long lifetime, which is reusable, and which can indicate its own temperature. The present invention electrode can be used in chemical industry processes, electrolysis, batteries, solar cells, and chemical sensors.

2. Discussion of the Background

Diamond is known to be resistant to high temperature and has a large band gap (5.5 eV). Furthermore, diamond has excellent electrical properties such that the breakdown voltage is high, the saturation velocities of carriers (electrons and holes) are also high, and the dielectric constant, and hence the dielectric loss, is small. Diamond also has excellent properties such as chemical inertness, high thermal conductivity, small specific heat and high stability under radioactive radiation.

Diamond is electrically a good insulator in its undoped state. However, it can be made semiconducting by doping suitable impurity atoms in it. For example, semiconducting p-type diamond can be synthesized by doping boron (B) in a high temperature-high pressure method or by chemical vapor deposition (CVD).

In the field of semiconductors, these features are very useful for electronic sensors and devices (e.g. thermistor, diode, and transistor) operational at high temperature, high frequency, and high electric field. However, there are few reports on the applications of diamond using both its electrical and physical characteristics at the same time. However, as one of such applications, a diamond electrode has been reported. See (1) K. Patel et al, Abstracts of the 3rd Joint Meeting of the Japan Solar Energy Society and the Japan Wind Energy Society (Sep. 20–21, 1991) pp. 105–108; (2) K. Patel et al, J. Photochem. Photobiol. A: Chem., Vol. 65, pp. 419–429 (1992); (3) R. Tenne et al, J. Electroanal. Chem. Vol. 347, pp. 409–415 (1993); (4) S. Yang et al, Advances in New Diamond Science and Technology, edited by Y. Saito et al (MYU, Tokyo 1994), pp. 741–744. In these papers, as grown diamond films were used as an electrode without any treatment.

Regarding CVD preparation of diamond films, the following techniques are known: microwave plasma CVD (for example, see Japanese patents (Kokoku) Nos. Hei 59-27754 and Hei 61-3320), radio-frequency plasma CVD, hot filament CVD, direct-current plasma CVD, plasma-jet CVD, combustion CVD, and thermal CVD. Generally speaking, diamond films grown by these methods on non-diamond substrates, such as silicon, are polycrystalline where diamond grains are coalesced in a random fashion, and therefore numerous grain boundaries exist in the film. However, it is possible to synthesize highly oriented diamond films or heteroepitaxial diamond films, where diamond grains are oriented in the same direction, by pretreating the substrate surface in a special manner. Furthermore, diamond films that are composed of only one kind of crystal face, (111) or (100), can be synthesized in the case of polycrystalline, highly oriented, and other diamond films.

When a diamond film is formed on bulk diamond, a diamond film with an arbitrary crystal face can be obtained by cutting and polishing the bulk diamond along a specific crystal surface. Therefore, it is possible to synthesize diamond films with any crystal surfaces.

It is well known that there exists a residual layer containing hydrogen, whose structure has not been identified, on the surface of as grown diamond films. Therefore, the surfaces of the "diamond films" used in the prior art are not a true surface of diamond. As a result, the characteristics of the electrodes are significantly inferior to those of true diamond.

Furthermore, the temperature of the electrode itself and the electrolytic solution in contact with it has been neither measured nor controlled. Therefore, it is impossible to detect such an emergency situation as overheating of the electrode. Moreover, the prior art has failed to solve the issue of the high cost of manufacturing a diamond film. The present invention is proposed to solve these problems for practical use of diamond electrode.

OBJECTS OF THE INVENTION

It is one object of the present invention to provide a diamond electrode which has high efficiency, a small overvoltage, a long lifetime, is reusable, and which can indicate its own temperature. The cost of manufacturing a diamond electrode can be reduced by the present invention.

SUMMARY OF THE INVENTION

The diamond electrode of the present invention is characterized by the fact that either the entire or partial area of the electrode is composed of semiconducting diamond whose surface has been chemically modified.

In another embodiment of the invention, undoped diamond crystals are fixed to a base electrode material, and their surfaces are covered with semiconducting diamond films, whose surfaces have been chemically modified.

In another embodiment of the invention, semiconducting diamond crystals are fixed to a base electrode material, and their surfaces are chemically modified.

The semiconducting diamond films used in the present invention can be synthesized by CVD, and are preferably B-doped within the density range of $10^{18}$–$10^{22}$ atoms of B/cm$^3$ of film.

As a variation of the present invention, it is possible that the electrode material is a semiconducting diamond film on which an undoped diamond film of 0.05–2 mm thickness is deposited.

The base electrode material may be composed of free-standing diamond film or carbon.

Diamond films useful in the present invention include those selected from polycrystalline diamond films, highly oriented diamond films, and heteroepitaxial diamond films. The surfaces of invention semiconducting diamond films and crystals include the (111) face and (100) face.

It is preferable to chemically modify the surface of invention diamond electrodes by hydrogenation, oxidation, or halogenation. Other methods of chemical modification include the substitution of said diamond surface with one or more substituents chosen from the hydroxyl group, cyano group, amino group, carboxy group, sulfate group, nitro group, acetyl group, aromatic group, and alkyl groups having a molecular weight of 50 or more.

It is also possible to measure the invention electrode temperature by measuring the resistance of the semiconducting diamond films or crystals.

In the figures, the labels have the following meanings: 1; silicon substrate, 2; semiconducting diamond film, 3a, 3b; wires for output, 4; main wires, and 5a,5b; wires.

DETAILED DESCRIPTION OF THE PREFERRED EMBODIMENTS

The present invention is based on a discovery by the present inventors that it is possible to produce chemically stable high performance diamond electrodes by chemical modification of the surface. Thus, the present discovery provides high performance diamond electrodes, which have high efficiency, a low overvoltage, and which are stable for a long time, by using semiconducting diamond films, or a combination of undoped and semiconducting diamond films, and by chemically modifying the surface of the diamond electrode. The same effect can be obtained by chemically modifying the surface of the semiconducting diamond film deposited on diamond crystals fixed to a base electrode material.

Figure 2:
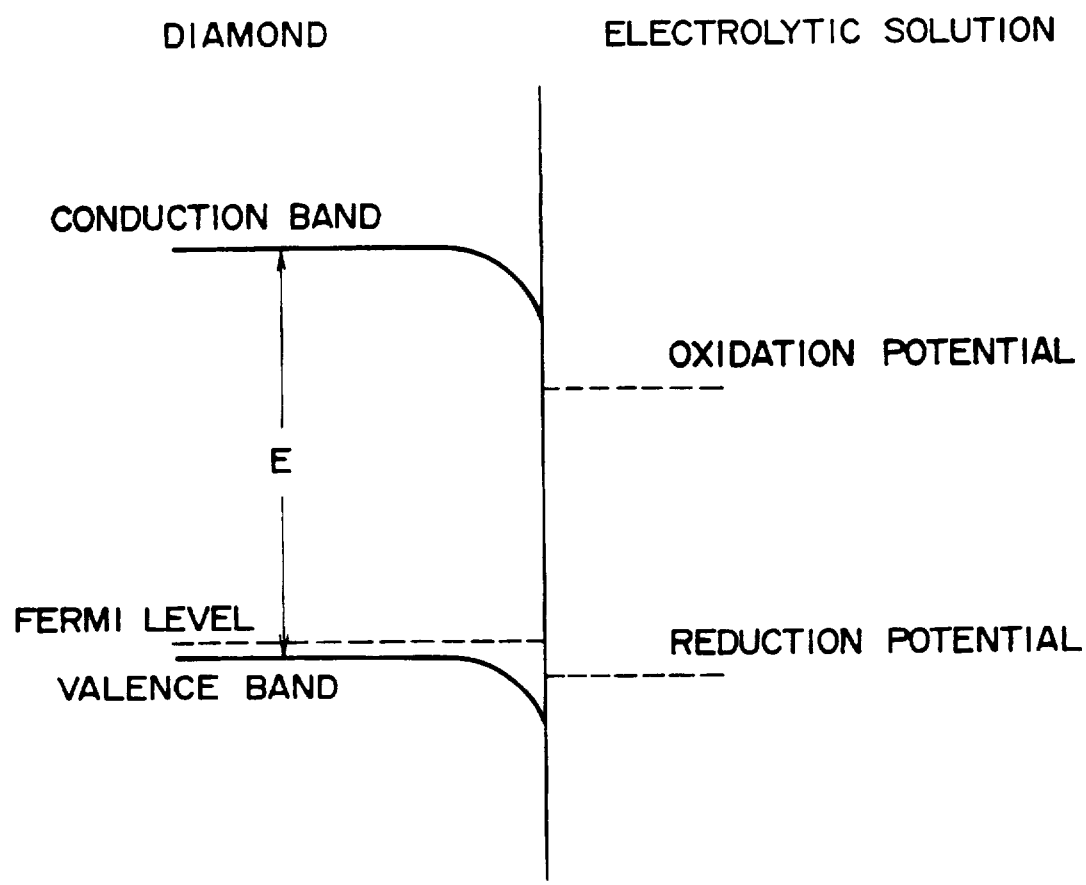
FIG. 2 schematically shows an energy band diagram when a p-type semiconducting diamond electrode of the prior art is in contact with an electrolytic solution.
Figure 3:
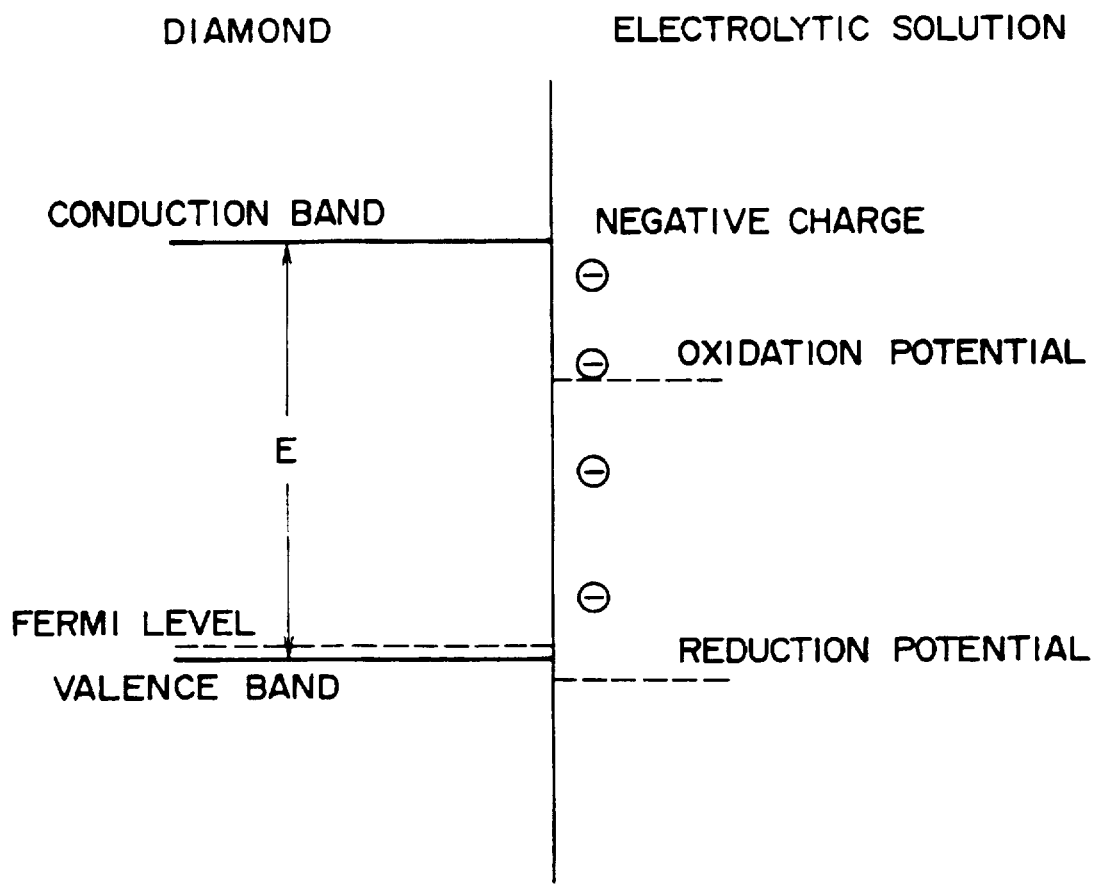
FIG. 3 schematically shows an energy band diagram when a p-type semiconducting diamond electrode, chemically modified by one or more substituents which have negative charges at the surface, is in contact with an electrolytic solution, according to the present invention.
Figure 4:
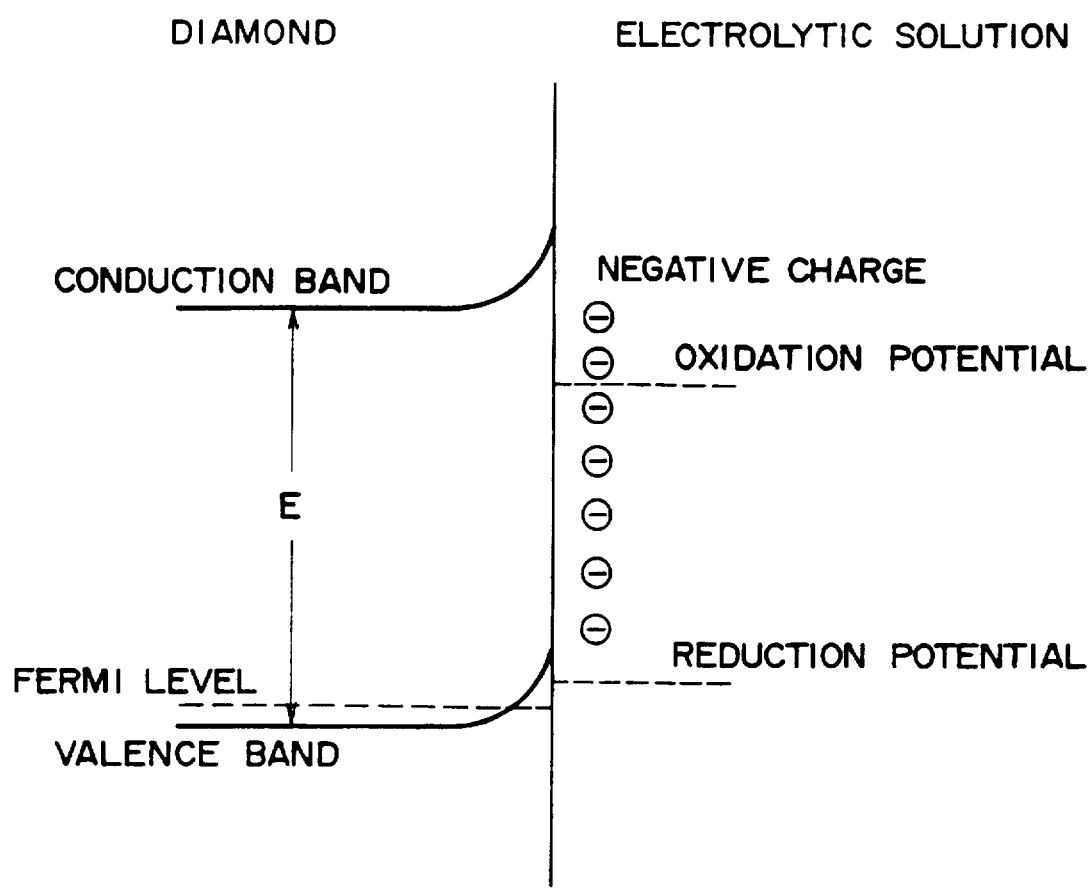
FIG. 4 schematically shows another example of an energy band diagram when a p-type semiconducting diamond electrode, chemically modified by one or more substituents which have negative charges at the surface, is in contact with an electrolytic solution, according to the present invention.

The influence of the chemical modification of the diamond electrode surface on the properties of the electrode is thought to be explained by the energy band diagrams of FIGS. 2-4. FIG. 2 schematically shows an energy band diagram for a p-type semiconducting diamond electrode of the prior art without surface modification in contact with an electrolytic solution. As shown in FIG. 2, the oxidation and reduction potentials of the electrolytic solution are located in the forbidden band of the diamond electrode. It should be noted that the reduction potential is located between the top of the valence band and the Fermi level of the diamond electrode. In the band structure of the diamond electrode without surface modification, since the position of the top of the valence band and the bottom of the conduction band are bent upward at the interface, the charge transfer between the diamond electrode and the electrolytic solution is obstructed. This results in a large overvoltage in the electrolysis.

FIGS. 3 and 4 schematically show energy band diagrams when a diamond electrode, which has been chemically modified with a substituent such as a hydroxyl group which has a negative charge at the surface, is in contact with an electrolytic solution. As shown in FIG. 3, the oxidation potential of the electrolytic solution is located in the forbidden band of the diamond electrode, similar to FIG. 2, on the other hand, the reduction potential of the electrolytic solution is located in the valence band of the diamond electrode. Since the surface of the diamond electrode is substituted with hydroxyl groups, the top position of the valence band and the bottom position of the conduction band of the diamond electrode at the interface of the electrolytic solution are not altered because of the negative electric charge of the hydroxyl groups.

The energy level of a diamond electrode which is modified by a negative substituent such as a hydroxyl group is different for different electrolytic solutions. For example, as shown in FIG. 4, the top position of the valence band and the bottom position of the conduction band are bent upward at the interface between the diamond electrode and the electrolytic solution. As a result, the oxidation potential of the electrolytic solution is located in the forbidden band of the diamond electrode, as in FIGS. 2 and 3, but the reduction potential of the electrolytic solution is located above the Fermi level of the diamond electrode. Furthermore, since the top position of the valence band is located above the Fermi level, the reduction potential exists in the forbidden band of the diamond electrode. Therefore, when the diamond electrode is modified as in FIGS. 3 and 4, the barrier of the charge transfer due to holes disappear, and hence the overvoltage is reduced.

When the substituent is hydrogen, the diamond electrode exhibits hydrophobic behavior. By contrast, when the substituent is hydroxyl, the diamond electrode exhibits hydrophilic behavior, and charge transfer is facilitated when the electrolytic solution is an aqueous solution. As described so far, it is important to select an appropriate chemical modification of the diamond electrode surface, depending on the electrolytic solution.

The most appropriate kinds and methods of chemical modification to be used in the present invention are explained as follows.

The surface of a diamond electrode synthesized by CVD is terminated by hydrogen. However, the hydrogen can be substituted by new substituents containing oxygen, converting the C—H structure to, e.g. the C—O structure by treatment, for example, with a mixed solution of concentrated sulfuric acid and chromic acid, or with oxygen plasma. Also, the surface of the diamond electrode can be chemically modified by a variety of substituents by means of known chemical reactions within the skill of the ordinary artisan.

Generally, hydrogenation, oxidation, or halogenation are useful chemical modifications. When the electrode is used in an aqueous solution, the surface of the diamond electrode must be terminated by one or more kinds of hydrophilic substituents selected from the hydroxyl group, cyano group, amino group, carboxyl group, sulfate group, and nitro group. When the electrode is used for special chemical reaction processes, it must be modified by hydrogen, acetyl group, or hydrophobic groups, such as alkyl or aromatic groups with a molecular weight of 50 or more.

The characteristics of the diamond electrode are similar, irrespective of the kind of electrolytic solution; i.e., an aqueous solution, an organic solvent, or a mixed solution of aqueous solution and organic solvent, if proper chemical modification is selected. In general, organic electrode reactions are dependent on the electronic properties of the electrode material, and it is possible to use the present diamond electrode for specific organic chemical reactions.

When diamond is used as an electrode, the erosion of the electrode by active oxygen is significantly smaller than with a carbon electrode, even when oxygen is generated at the electrode, because diamond is more inert than carbon. Even if the surface of a diamond electrode is deteriorated, the diamond electrode can be made reusable by surface remodification after the surface of diamond has been cleaned by, e.g., chromic acid or oxygen plasma treatment.

In the present invention, chemical modification is usually done before the diamond electrode is actually used. However, it is possible to undertake the chemical modification during its use under certain conditions. For example, when a nitrate aqueous solution is reduced by electrolysis, the surface of the diamond electrode is spontaneously substituted with nitro groups during electrolysis, if the surface of the diamond electrode has been oxidized. Thus, a suitable in situ chemical modification can be selected, depending on the environment where diamond electrode is used.

In the present invention, semiconducting diamond films or diamond crystals are used as the electrode. As described above, semiconducting diamond films can be synthesized by CVD. However, it should be noted that the diamond electrode in the present invention is not necessarily composed of a uniform semiconducting diamond. It can be composed of semiconducting diamond film, or a multi-layer of semiconducting diamond film and undoped diamond film. Furthermore, the concentration of boron, used as an optional dopant for p-type semiconducting diamond films, can have a non uniform distribution in the film.

For the synthesis of p-type semiconducting diamond films by CVD, boron is doped in the film. The atomic boron concentration in diamond can be up to $10^{23}/cm^3$. However, if the boron concentration is too high, the crystal quality of diamond will be poor. On the other hand, when the boron concentration is not high enough, the electric conductivity of diamond becomes too low, and hence the diamond film can not be used as an electrode.

In the prior art, it was reported that the properties of a diamond electrode strongly depend on the boron concentration of semiconducting diamond, and the only reported B/C ratio, the ratio of the number of boron atoms to the number of carbon atoms, is $10^{-4}$, or $1.8 \times 10^{19}/cm^3$ in terms of the atomic boron concentration in diamond.

However, the present inventors have found that the characteristics of the diamond electrode are basically unchanged, even if the atomic boron concentration in the semiconducting diamond film was within a range from $10^{18}/cm^3$ to $10^{22}/cm^3$, if the surface of semiconducting diamond film is covered with an undoped diamond layer whose thickness is between 0.05 and 2 mm. Especially, it was found by the present inventors that electric current flows from the electrode to the electrolytic solution more easily than in the reverse direction.

Therefore, in the present invention the atomic boron concentration in diamond can be between $10^{18}/cm^3$ and $10^{22}/cm^3$, and the variation of the electrode characteristics is more stable in the above bilayer structure. The stability is improved if the boron concentration has a distribution within a single diamond film electrode such that it is higher in the diamond bulk and lower toward the surface, and the surface is undoped. It should be noted that the electrical resistance of the diamond electrode is too high if the atomic boron concentration is lower than $10^{18}/cm^3$.

In the present invention, it is possible to produce a diamond electrode using semiconducting diamond crystals fixed to a non-diamond electrode material, where the surface of the semiconducting diamond crystals are chemically modified. Since the cost of synthetic diamond crystal is lower than that of diamond film at the present stage, the cost to produce a diamond electrode with diamond crystals is significantly lower.

Generally, carbon is most commonly used as an electrode material in a wide range of industries from the electric cell industry to the chemical industry. In the present invention, it was found that carbon can be used as a base electrode material, which is to be covered with diamond film or diamond crystals. By this method, the characteristics of diamond-coated carbon electrode are significantly improved over those of a base carbon electrode; for example, the overvoltage of diamond-coated carbon electrode is lower than that of the conventional carbon electrode, and furthermore, the amount of the gas generated at the electrode is decreased. It should also be noted that the waste of used diamond electrodes does not pollute the environment, as diamond consists of nontoxic carbon atoms only.

When light is irradiated on the diamond electrode, the electrode characteristics are improved, because the electrons in diamond are excited from the valence band to the conduction band. As shown in FIG. 2, the energy band gap of diamond is 5.5 eV. Therefore, when the wavelength of the irradiated light is shorter than 0.2 mm, electrons are directly excited from the valence band to the conduction band. Similar effects can be obtained by irradiating a visible light, even though the wavelength is longer than 0.2 mm, because there are many defects and impurities in diamond that create many electronic states in the forbidden band.

It was found in the present invention that the electrical properties of a diamond electrode strongly depend on the crystal facet of diamond. As described before, it is possible to control the crystal facet of diamond in CVD. In the present invention, it was found that the efficiency of the diamond electrode can be improved by selecting either the (111) or (100) crystal face at the surface of the diamond electrode, depending on the electrolytic solution. The morphology of the invention diamond film is preferably a polycrystalline diamond film, highly oriented diamond film, or heteroepitaxial diamond film.

It is known that the electrical resistance of semiconducting diamond decreases with increasing temperature. Therefore, the diamond electrode of the present invention can be used as both electrode and thermistor; i.e., a temperature sensor. Therefore, the temperature of the electrode and its environment can be measured to provide information for providing or controlling the most appropriate conditions of operation. For example, since the efficiency of electrolysis strongly depends on temperature, it is necessary to control the temperature of the bath for electrolysis to obtain the best operational conditions of electrolysis.

In the present invention, the diamond electrode itself can be used as a thermistor simply by connecting extra wires to measure the electric resistance of the semiconducting diamond film or crystals. Therefore, it is possible to monitor the temperature of the electrode surface, where reactions are actually occurring. Thus, more efficient control of electrolysis is possible, and a quick response to such an accident as overheating can be carried out by using the present invention electrode.

EXAMPLES

The present invention is more particularly described by way of the following non-limiting examples.

A p-type semiconducting diamond film of about 10 mm thickness was grown by microwave plasma CVD on a rectangular, low resistivity silicon substrate (10 mm×20 mm) which had been buff-polished with diamond powder. This sample will be referred to as Reference 1. During CVD, the substrate temperature was kept at 800°–890° C., the source gas was a methane/oxygen/diborane/hydrogen mixed gas with a methane concentration of 1–5%, oxygen concentration of 0.1–2%, and diborane concentration of 1 ppm. The chamber pressure was at 30–60 Torr and the growth time was 20 hours.

Another sample of Reference 1 was made and then treated by oxygen plasma in a radio-frequency plasma CVD apparatus to oxidize the surface of the diamond film. This sample will be referred to as Example 2. The oxygen plasma treatment was carried out for 3 minutes with the chamber pressure at 0.01 Torr.

Using the CVD conditions of Reference 1, a p-type diamond film of 10 mm thickness was grown with 10 ppm diborane in the source gas. Then an undoped diamond film was grown to 0.1 mm thickness, and the oxygen plasma treatment was carried out using the same conditions as Example 2. This sample will be referred to as Example 3.

A p-type semiconducting, highly oriented diamond film of about 10 mm thickness was grown by microwave plasma CVD on a rectangular, low resistivity silicon (100) substrate (10 mm×20 mm) which had not been polished. The CVD conditions were the same as Reference 1 and Examples 2 and 3. Then, the oxygen plasma treatment was carried out on the p-type diamond film in the same conditions as Example 2. This sample will be referred to as Example 4.

For wiring, copper foils (5 mm×10 mm) were bonded with silver paste to the back of the substrate of the samples of Reference 1, and Examples 2–4. The surface of diamond was then sealed with epoxy resin, except for a rectangular (0.5 mm×15 mm) area. The current efficiency and overvoltage were measured using these samples as an anode and a platinum electrode as a cathode. For Example 4, only current efficiency was measured. These results are listed in Table 1. The overvoltage was estimated in a 0.1M-NaCl solution using a calomel electrode as a reference electrode. The current efficiency was estimated from the amount of hydrogen and chlorine generated at the electrode.

The current efficiency under an illumination of an AM1 light and mercury lamp was measured for Reference 1 and Examples 2 and 3. These results are also listed in Table 1.

TABLE 1

| | Sample No. | Current efficiency (%) | Over-voltage (V) | Current efficiency (%) under illumination of | |
|---|---|---|---|---|---|
| | | | | AM1 light | Mercury lamp |
| Reference | 1 | 88.2 | 0.12 | 89.0 | 91.2 |
| Example | 2 | 95.3 | 0.04 | 96.4 | 98.6 |
| | 3 | 95.5 | 0.06 | 96.7 | 99.3 |
| | 4 | 97.0 | — | — | — |

As shown in Table 1, Examples 2 and 4, in which the diamond electrodes were chemically modified by oxidization, showed higher current efficiency than Reference 1. As shown in Examples 2 and 3, the overvoltage of diamond electrode was reduced under 0.1 V by chemical modification. This result demonstrates that by selecting the solution, the solvent and the temperature, it is possible to reduce the overvoltage within ±0.05 V. Moreover, since the current efficiency was improved, the loss of electric power also was reduced. The reason that the current efficiency of Example 3 is higher than Example 2 is that the energy loss by resistive heating was smaller, because the boron doping concentration of Example 3 is higher than that of Example 2, and hence the resistance is lower.

The surface of the diamond film in Example 4 consisted of highly oriented (100) crystals. It is seen that the current efficiency of Example 4 is higher than Example 2, which was synthesized with similar CVD conditions.

By illumination with a light from a mercury lamp, the current efficiencies of both the Examples and Reference were enhanced by 3 to 4%. Since the AM1 light has the same spectral distribution as the solar ray, the current efficiency was not enhanced as much as mercury lamp.

The current efficiencies were measured periodically with time for Reference 1 and Examples 2 and 3 in a 0.1M solution of sodium nitrite. Furthermore, infrared spectra of C—H and N—O stretching bands at the surface of diamond film were measured by Total Reflection Fourier Transform Infrared Absorption. The results are shown in Table 2, where the absorption strength is given relatively in reference to the maximum strength as 1.0.

TABLE 2

| Sample No. | Measurement | 5 hrs | 10 hrs | 20 hrs | 50 hrs | 100 hrs |
|---|---|---|---|---|---|---|
| Reference 1 | Current efficiency (%) | 88.2 | 88.5 | 89.2 | 89.0 | 89.0 |
| | Absorption intensity of N—O stretching band | 0.2 | 0.4 | 0.6 | 0.9 | 1.0 |
| | Absorption intensity of C—H stretching band | 1.0 | 0.9 | 0.9 | 0.8 | 0.8 |
| Example 2 | Current efficiency (%) | 95.3 | 96.7 | 98.2 | 98.7 | 99.0 |
| | Absorption strength of N—O stretching band | 0.4 | 0.8 | 0.9 | 1.0 | 1.0 |
| | Absorption intensity of C—H stretching band | 1.0 | 0.8 | 0.8 | 0.8 | 0.8 |
| Example 3 | Current efficiency (%) | 95.2 | 97.0 | 98.7 | 99.0 | 99.5 |
| | Absorption intensity of N—O stretching band | 0.4 | 0.8 | 0.9 | 0.9 | 1.0 |
| | Absorption intensity of C—H stretching band | 1.0 | 0.9 | 0.8 | 0.8 | 0.8 |

As shown in Table 2, the infrared absorption strength of the C—H stretching band decreased and the infrared absorption strength of the N—O stretching band increased with electrolysis time for all samples. This indicates that during electrolysis, the surface of diamond film changed from a C—H structure to a C—$NO_2$ structure. Namely, the diamond electrode was chemically modified during the electrolysis, and as a result, the current efficiency increased with the electrolysis time.

The surface of the diamond electrode of Example 2, used in the experiment, was treated again by oxygen plasma, and then characterized by the same method as shown in Table 1. The result was almost the same as in Table 1. This means that the diamond electrode in the present invention is reusable.

Using Example 2, the overvoltage immediately after the start of the electrolysis was compared with the overvoltage after a 100 hour operation in a 0.1M solution of sodium chloride and of sodium nitrite. The temperature of sodium chloride solution was maintained at 60° C. The results were listed in Table 3.

TABLE 3

| Sample | Electrolytic solution | Overvoltage (V) Immediately after the start of electrolysis | Overvoltage (V) After the end of electrolysis |
|---|---|---|---|
| Example 2 | Sodium chloride solution | 0.04 | 0.02 |
|  | Sodium nitrite solution | 0.08 | 0.02 |

As shown in Table 3, the overvoltage after the end of the electrolysis reaction was lower than that immediately after the start for both cases. This is presumably because the surface of diamond electrode was chemically modified during electrolysis as characterized in Table 2.

Figure 1:
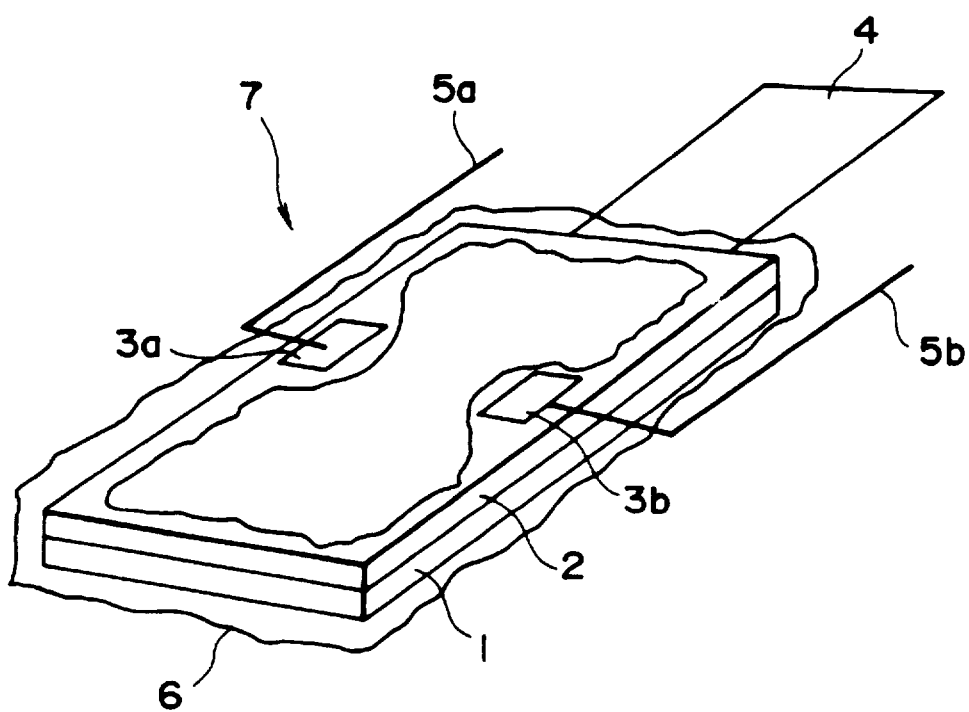
FIG. 1 is a schematic diagram of a diamond electrode according to the present invention.

A diamond electrode which can also be used as thermistor was fabricated. An example of the diamond electrode structure which can function as a temperature sensor is shown in FIG. 1. As shown in FIG. 1, a p-type semiconducting diamond film 2 was grown on a conducting silicon substrate 1 by the same method as Reference 1. Next, the surface of the diamond film 2 was covered with a metal mask and a pair of electrodes 3a and 3b of platinum film were formed by sputtering. Main wires 4 to supply electric power were attached on the back of the silicon substrate 1 and electrically sealed wires 5a and 5b were connected to the electrode 3a and electrode 3b. Finally, the silicon substrate 1, the wires for signal output 3a and 3b, and the pair of main wires 4 were covered with epoxy resin to form an insulating seal 6, and then a diamond electrode 7 was fabricated. The insulating seal 6 plays a role such that only the surface of the diamond film came in touch with the electrolytic solution.

By using the diamond electrode 7, electrolysis was carried out in the same conditions as in Reference 1 and Examples 2 and 4. It was found that the surface temperature of diamond electrode 7 increased with time, and the resistance between the wire 5a and the wire 5b decreased by about 2%. This corresponds to a temperature rise of about 30° C. Namely, by connecting wires to measure the electric resistance of the diamond electrode, the surface temperature of the diamond electrode can be measured, and the electrode operation can be effectively controlled. In a diamond electrode provided with temperature measurement ability, the shape, the material, the arrangement and the position of electrodes for signal output can be freely chosen. For the substrate material, it is also possible to use metals or insulating materials such as silicon nitride.

In order to compare characteristics of a carbon electrode with those of a diamond electrode, a carbon stick was covered with a diamond film in the following manner: first carbon paste was thinly painted on the surface of the carbon stick, and then diamond powder of average particle size of 20 mm was spread. This sample was then treated in vacuum at 800°–1000° C., and a semiconducting diamond film of about 30 mm thickness was grown by CVD under the same conditions as Reference 1 and Examples 2 and 4. As a result, about 80% of the surface of the carbon stick was covered with a semiconducting diamond film. The current efficiency and the erosion of the electrode were measured by the same method as in Table 2 for both diamond-coated and bare carbon electrodes. It was found that the current efficiency of the diamond-coated electrode was about 58% better, and the erosion of the electrode was 80% better than those of the untreated electrode. Therefore, it was shown that the characteristics of widely used carbon electrodes can be improved by the present invention.

In order to compare the effects of various methods of chemical modification and the kinds of electrolyte solution on current efficiency, current efficiency was measured by the same method as in Table 2 for several kinds of surface modification and the electrolytic solution shown in Table 4. The results are listed in Table 4, where O means an excellent improvement, o means an improvement, Δ means no change, and x means a reduction of the current efficiency. Here, hydrogenation means that the surface of the diamond electrode was treated by hydrogen plasma after the same surface treatment as in Example 2.

TABLE 4

| Electrolytic solution | Surface treatment method | | | | | | | | | |
|---|---|---|---|---|---|---|---|---|---|---|
| Solute/Solution | H | O | Ha | Hy | Cy | Am | Ca | Su | Ni | He |
| Sodium chloride/ aqueous solution | Δ | ● | x | ● | Δ | Δ | ○ | ○ | Δ | Δ |
| Sodium chloride/ weak acid | Δ | ● | x | ● | ● | Δ | x | x | ● | ○ |
| Sodium chloride/ weak base | ○ | ● | x | x | x | x | ● | ● | x | x |
| Sodium nitrite/ aqueous solution | Δ | ● | x | ● | Δ | Δ | Δ | Δ | Δ | Δ |
| Sodium nitrite/ weak acid | Δ | ● | x | ● | ● | Δ | x | x | ● | ○ |
| Sodium nitrite/ weak base | ○ | ● | x | x | x | x | ● | ● | x | x |
| Hydrochloric acid/ aqueous solution | Δ | ● | ○ | ● | ● | Δ | x | x | ● | ○ |
| Sodium hydroxide/ aqueous solution | ○ | ● | x | x | x | x | ● | ● | x | x |
| Amino acid/ aqueous solution | ○ | Δ | ○ | ● | ● | ● | Δ | Δ | Δ | ● |

H: Hydrogenation
O: Oxidation
Hy: substitution with hydroxyl group
Cy: substitution with cyano group
Am: substitution with amino group
Ca: substitution with carboxyl group
Su: substitution with sulfate group
Ni: substitution with nitro group
He: substitution with hexamethylene diamine group As shown in Table 4, the current efficiency is improved, and the electrode characteristics are better by selecting a proper method of chemical modification of the diamond electrode surface depending on the conditions used.

SUMMARY

The present invention makes it possible to provide a diamond electrode with high efficiency, a small overvoltage and a long lifetime, which is reusable, and which can measure its own temperature during the operation. Moreover, the present invention makes it possible to reduce electrode cost by using carbon as a base electrode material, combined with diamond crystals that reduce cost. The present invention can be used in chemical industry processes, in electrolysis, in an electric cell, a solar battery, and in chemical sensors.

This application is based on Japanese patent application 07-163561, incorporated herein by reference.

What is claimed as new and desired to be secured by Letters Patent of the United States is:

1. A diamond electrode comprising a semiconducting diamond film whose surface is chemically modified, wherein said surface chemical modification is hydrogenation, oxidation, or surface substitution by one or more selected from the group consisting of a hydroxyl group, cyano group, carboxyl group, sulfate group, nitro group, acetyl group, and aromatic or alkyl groups with a molecular weight of 50 or more.

2. A diamond electrode according to claim 1, wherein said semiconducting diamond film is boron doped.

3. A diamond electrode according to claim 2, wherein a base electrode material side of the diamond film is semiconducting diamond whose surface is undoped.

4. A diamond electrode according to claim 3, wherein the thickness of said undoped diamond film is 0.05 to 2 mm.

5. A diamond electrode according to claim 2, wherein said doping concentration of boron is $10^{18}$ to $10^{22}/cm^3$.

6. A diamond electrode according to claim 1, wherein said diamond film is a polycrystalline film, highly oriented film, or heteroepitaxial film.

7. A diamond electrode according to claim 1, wherein said surface chemical modification is hydrogenation or oxidation.

8. A diamond electrode according to claim 1, wherein said surface chemical modification is surface substitution by one or more of a hydroxyl group, cyano group, acetyl group, carboxyl group, sulfate group, nitro group, acetyl group, and aromatic or alkyl groups with a molecular weight of 50 or more.

9. A diamond electrode according to claim 1, wherein a surface of said semiconducting diamond film has a facet of either (111) or (100).

10. A diamond electrode according to claim 1, wherein wires for the measurement of electric resistance are attached to said semiconducting diamond film.

11. A diamond electrode in which diamond crystals are fixed to a base electrode material and coated with semiconductor diamond film, whose surface is chemically modified, wherein said surface chemical modification is hydrogenation, oxidation, or surface substitution by one or more selected from the group consisting of a hydroxyl group, cyano group, carboxyl group, sulfate group, nitro group, acetyl group, and aromatic or alkyl groups with a molecular weight of 50 or more.

12. A diamond electrode according to claim 11, wherein said base electrode material is free standing diamond film.

13. A diamond electrode according to claim 12, wherein said base electrode material is carbon.

14. A diamond electrode according to claim 11, wherein a surface of said semiconducting diamond crystals has a facet of either (111) or (100).

15. A diamond electrode according to claim 11, wherein wires for the measurement of electric resistance are attached to said semiconducting diamond crystals.

16. A diamond electrode, wherein semiconducting diamond crystals are fixed to a base electrode material, the surfaces of said semiconducting diamond crystals being chemically modified, wherein said surface chemical modification is hydrogenation, oxidation, or surface substitution by one or more selected from the group consisting of a hydroxyl group, cyano group, carboxyl group, sulfate group, nitro group, acetyl group, and aromatic or alkyl groups with a molecular weight of 50 or more.

17. A diamond electrode comprising a boron doped semiconducting diamond film, whose surface is chemically modified, wherein said doping concentration of boron is $10^{18}$ to $10^{22}/cm^3$.

18. The diamond electrode of claim 17, wherein a base electrode material side of the diamond film is semiconducting diamond whose surface is undoped.

19. The diamond electrode of claim 18, wherein the thickness of said undoped diamond film is 0.05 to 2 mm.

20. The diamond electrode of claim 17, wherein wires for the measurement of electrical resistance are attached to said semiconducting diamond film.

* * * * *